United States Patent [19]

Barendsen

[11] 4,223,748

[45] Sep. 23, 1980

[54] METHOD OF COLLECTING DUST DURING ROCK DRILLING AND A DUST COLLECTING SUCTION SYSTEM FOR A ROCK DRILLING APPARATUS

[75] Inventor: Pieter Barendsen, Tyresö, Sweden

[73] Assignee: Atlas Copco Aktiebolag, Nacka, Sweden

[21] Appl. No.: 965,747

[22] Filed: Dec. 4, 1978

[30] Foreign Application Priority Data

Dec. 8, 1977 [SE] Sweden ............................... 7713916

[51] Int. Cl.³ ............................................... C09K 7/00

[52] U.S. Cl. ...................................... 175/66; 175/206; 175/209; 55/97; 55/342; 55/419; 55/429; 55/434; 209/137

[58] Field of Search ................. 55/1, 97, 96, 261, 302, 55/342, 392, 394, 395, 429, 432, 433, 419, 467, 434; 209/137-139; 175/209-211, 206, 66

[56] References Cited

U.S. PATENT DOCUMENTS

| | | | |
|---|---|---|---|
| 646,253 | 3/1900 | Banister | 55/419 |
| 895,228 | 8/1908 | Bartlett | 175/206 |
| 1,157,131 | 10/1915 | Sutton | 55/429 |
| 1,197,622 | 9/1916 | Hallowell | 209/139 |
| 1,522,151 | 1/1925 | Stebbins | 209/138 |
| 2,182,165 | 12/1939 | Smith | 175/206 |
| 2,760,595 | 8/1956 | Pynor | 55/432 |
| 3,720,314 | 3/1973 | Phillipi | 55/261 |
| 3,887,020 | 6/1975 | Chaffin | 175/206 |
| 3,910,360 | 10/1975 | Sundstrom | 55/96 |

FOREIGN PATENT DOCUMENTS

| | | | |
|---|---|---|---|
| 396066 | 7/1933 | United Kingdom | 175/66 |

*Primary Examiner*—Bernard Nozick
*Attorney, Agent, or Firm*—Holtz Frishauf

[57] ABSTRACT

In a dust collecting suction system for a rock drilling apparatus, the air rushing out of the borehole is collected in a hcod and sucked through a coarse dust separator and a filter unit. The coarse dust from the separator is cleaned by an air currrent to remove remaining fine particles and then it is dumped on the ground whereas the finer dust from the filter unit is collected in plastic bags.

12 Claims, 3 Drawing Figures

METHOD OF COLLECTING DUST DURING ROCK DRILLING AND A DUST COLLECTING SUCTION SYSTEM FOR A ROCK DRILLING APPARATUS

BACKGROUND OF THE INVENTION

This invention relates to a method of collecting dust during rock drilling and it relates also to a dust collecting suction system for a rock drilling apparatus.

It is an object of the invention to provide a dust collecting suction system which reduces the load on the filter unit that is part of the system, and to provide a system that is endurable to wear. It is also an object of the invention to permit dumping of most of the collected drill dust on the ground without being hazardous to the operator's health.

DETAILED DESCRIPTION

Figure 1:
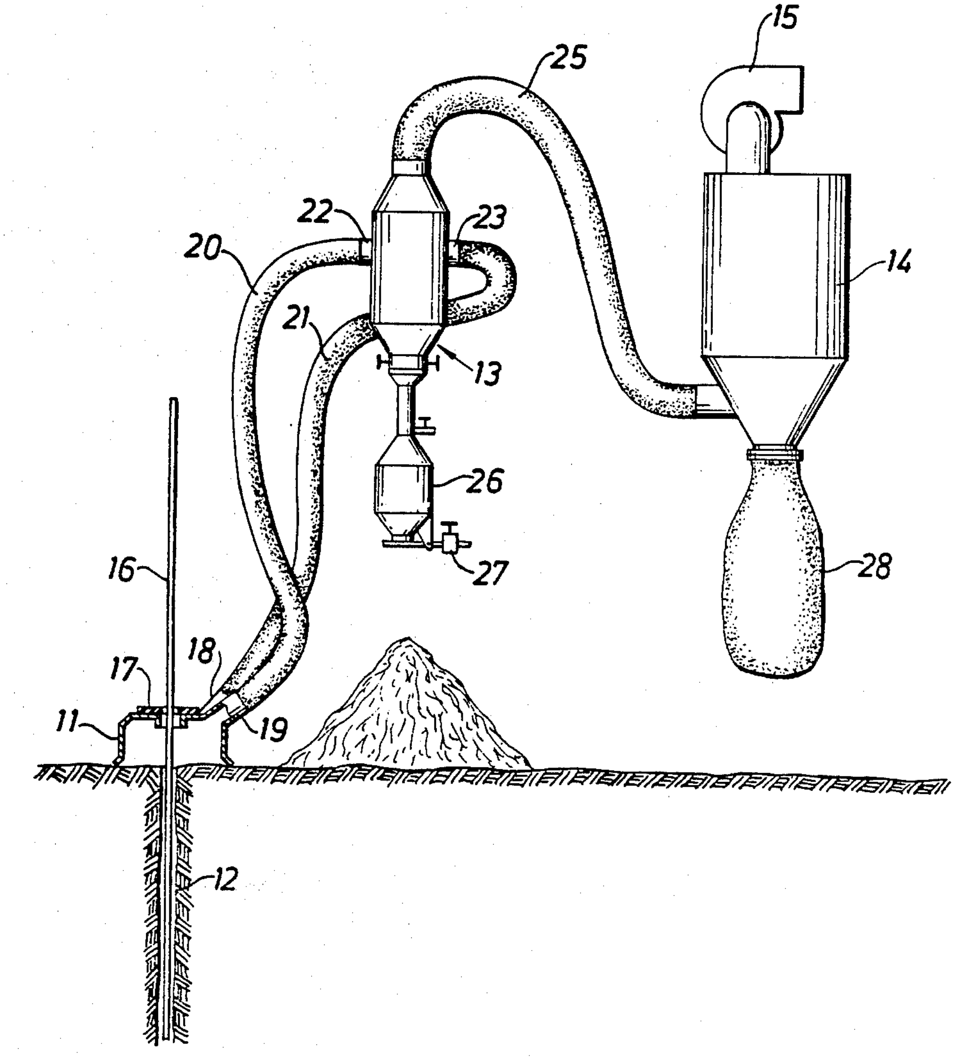
FIG. 1 shows a dust collecting suction system in accordance with the invention.

The dust collecting suction system shown in FIG. 1 comprises a hood 11 located over the mouth of a borehole 12, a separator 13 for coarse dust and a filter unit 14 with a suction fan 15. A drill stem 16 for drilling the borehole extends through the hood 11 that has a rubber seal 17 that seals against the drill stem 16.

When the suction system is used for example on crawler drill wagons, both the separator 13 and the filter unit 14 can be mounted on the frame of the crawler wagon. The hood 11 can then either be a loose hood or it can be mounted on the feed beam for the rock drill that operates the drill stem 16. Since the drilling apparatus itself is not part of the invention, only the drill stem 16 of the drilling apparatus is illustrated.

Figure 2:
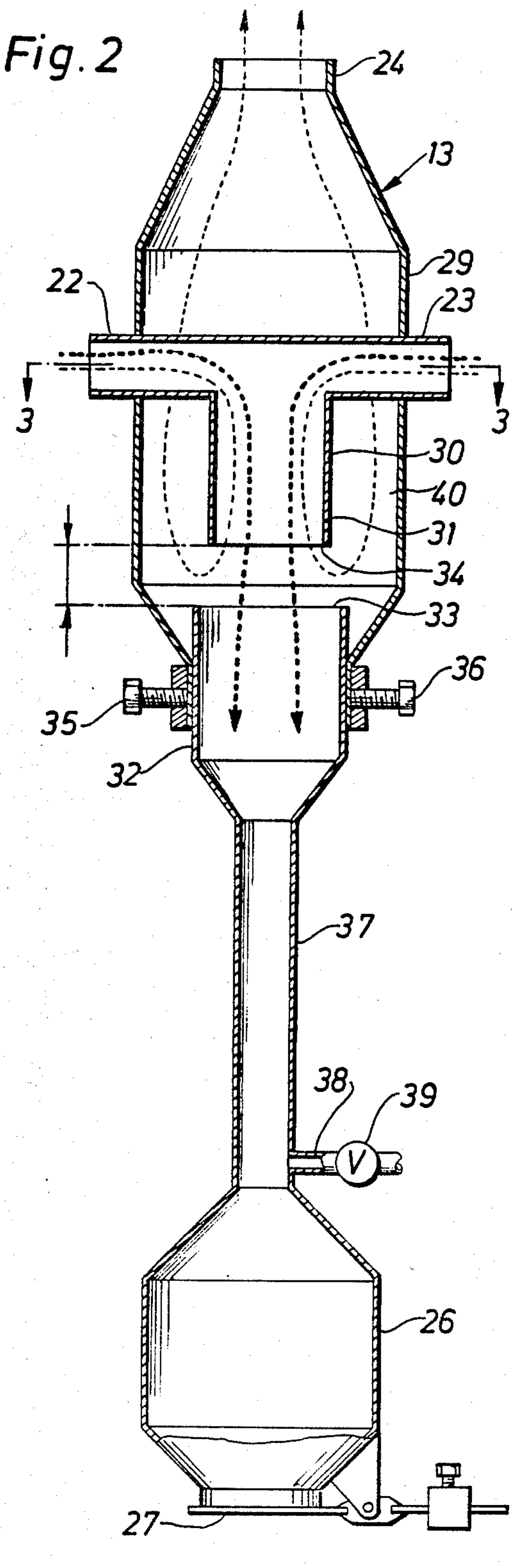
FIG. 2 is a longitudinal section through a coarse dust separator that is shown in FIG. 1.
Figure 3:
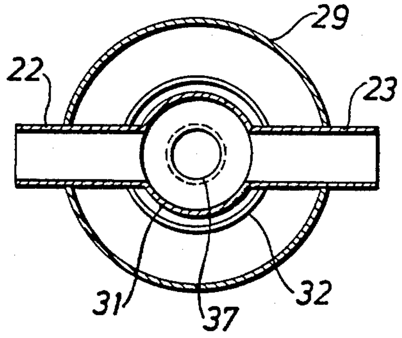
FIG. 3 is a transverse section taken along line 3—3 in FIG. 2.

The hood 11 has two fittings 18, 19 for flexible hoses 20, 21 which have their other ends coupled to two fittings 22, 23 on the coarse separator 13. A hose 25 leads from an outlet 24 on the top of the separator 13 to the filter unit 14. The separator 13 is provided with a container or hopper 26 that has a door 27 with a counterweight, and a plastic bag 28 can be attached to the filter unit. The separator 13 is shown in a longitudinal section in FIG. 2. It comprises a housing 29 in which a T-pipe 30 is affixed by welds so that the two diametrically opposite pipes extend through the wall of the housing 29 and forms the two inlet fittings 22, 23 of the separator. The large diameter central pipe 31 of the T-pipe 30 is coaxial with the housing 29 so that an annular duct 40 is formed between the pipe and the housing. The central pipe 31 is also coaxial with a collector 32 for coarse dust. The collector 32 has a mouth 33 that is axially spaced from the mouth 34 of the central pipe 31, and the collector 32 is axially displaceable in the housing 29 and lockable by means of two locking screws 35, 36. The collector 32 is reduced like a funnel to a pipe 37 that extends into the hopper 26. On the pipe 37, there is a branch conduit 38 with an adjustable valve 39 through which atmospheric air can leak into the pipe 37. The mouth 33 of the collector has a larger diameter than the mouth 34 of the central pipe.

During drilling, the fan 15 sucks air from the filter unit 14 so that there will be subpressure in the entire system, and, as a result, the dust-carrying air that blows out of the borehole is sucked through the coarse dust separator 13 and the filter unit 14. The two air flows through the two inlets 22, 23 of the separator 13 collide and divert 90° downwardly, and then, the axial flow in the central pipe 31 diverts 180° when flowing out of the mouth 34 of the central pipe. Larger particles fall down into the collector 32 due to their inertia whereas finer particles go with the air out through the outlet 24 of the separator 13 and into the filter unit 14. The paths of the coarse and fine dust are indicated schematically in FIG. 2 by large and fine points respectively. By displacing the collector 32 axially in the housing 29, the cut-off point can be varied. When the distance between the two mouths 33 and 34 is increased the cut-off point is moved towards smaller particle size. The small airflow through the valve 39 provides an airflow upwardly through the collector 32. The air flow in the collector permits the coarse dust to fall down through the collector but causes finer particles to return; that is finer particles that should go with the air through the outlet 24 to the filter unit 14.

The two inlets 22, 23 of the T-pipe 30 are directed towards the axis of the central pipe 31 and they are located diametrically opposite each other. The inlets 22, 23 are shown at right angles to the axis of the central pipe but the T-pipe can alternatively have a Y-form. In both cases the two incoming air flows collide and divert due to their colliding. It is advantageous that no baffle or guide plate is needed since a baffle is subject to considerable wear. Since there is no baffle, the separator 13 will have a long life. The coarse dust is more wearing than the fine dust and since the coarse dust is removed from the air that enters the filter unit 14, the wear on the filter unit is reduced.

The door 27 opens when there is a predetermined load on it and it closes automatically when it has dumped the load. Instead of a counter weight operated door as illustrated, a power actuated door can be used. The hopper can also be provided with two doors forming a lock chamber to ensure that the coarse dust can be dumped without any risk of air rushing into the hopper. Alternatively the hopper can be made large enough to store all dust drilled before the drilling is stopped when another drill stem length is to be added so that the door need not be opened when suction is on.

The filter bags (non-illustrated) in the filter unit 14 are cleaned by means of repeated air pulses each time the drilling is interrupted so that the dust collected on the filter bags during drilling falls down into the plastic bag 28 which can then be replaced by an empty bag.

The coarse drill dust from the collector 13 is not hazardous to the operator's health like the fine dust collected in the filter, and it can therefore be dumped directly on the ground. As an alternative to collecting the fine dust in plastic bags, the fine dust can be treated to agglomerate, and then it can be dumped on the ground. Since the coarse dust is cleaned from remaining fine dust by a counter flow of air while falling through the tube 37, the cut-off point can be low, i.e. towards smaller particle size than otherwise, and still there will be very little dangerous fine dust (smaller than 5 microns) in the coarse dust that is dumped on the ground. At least 80–90% of the dust can therefore usually be separated as coarse dust and dumped on the ground.

What I claim is:

1. Dust collecting suction system for a rock drilling apparatus comprising a hood (11) arranged to collect the dust loaded flushing air that flows out of the borehole, a coarse dust separator (13) having at least one inlet (22,23) coupled to the suction hood, a filter unit (14) coupled to the coarse dust separator (13), and a suction unit (15) coupled to the filter unit (14) to suck the flushing air through the coarse dust separator and through the filter unit, the coarse dust separator (13) comprising:

a separator chamber coupled to said at least one inlet (22,23) for receiving said flushing air, said separator chamber including passage means defining a sharp bend in which said flushing air is diverted, a collector (32,33) in communication with the separator chamber adjacent said sharp bend for collecting coarse dust from the flushing air flowing through the separator chamber, the coarse dust, because of its inertia, not going with the air through said sharp bend, the flushing air from which the coarse dust has been separated being fed to the filter unit (14) for filtrating, a closed container (26) for the collected coarse dust, cleaning means (37, 38, 39) for cleaning the collected coarse dust from remaining fine dust by an air current, said cleaning means (37, 38, 39) including a substantially vertical elongated tube (37) coupled between the collector (32,33) and the closed container (26), the length of the elongated vertical tube (37) being several times the diameter thereof, and means (38, 39) coupled to the elongated vertical tube (37) for providing a current of air up through the tube (37) to clean the coarse dust that falls through the tube (37), the upward current of air from the tube (37) being fed to the filter unit (14) for filtration, and means (27) coupled to the closed container (26) to permit the coarse dust collected in the closed container (26) to be dumped on the ground.

2. Dust collecting suction system according to claim 1 wherein said means for providing a current of air through the tube (37) comprises a restricted passage (38, 39) at the lower portion of the tube (37) and open to atmosphere for admitting air from the atmosphere into the tube (37).

3. Dust collecting suction system according to claim 2 wherein said restricted passage (38, 39) comprises a variable restriction (39).

4. Dust collecting suction system according to either of claims 1 or 2 wherein the coarse dust separator (13) further comprises:

a housing (29) forming said separator chamber, and a central pipe (31) in the housing and spaced from the housing, a duct (40) being formed between the outside of the pipe and the inside of the walls of the housing, one of the pipe (31) and the duct (40) being coupled to the at least one inlet (22, 23) from the hood (11) and the other being coupled to the filter unit (14) so that the air stream through the coarse dust separator (13) is diverted 180° between the central pipe (31) and the duct (40), said collector (32, 33) for collecting coarse dust being coaxial with the central pipe (31) but axially spaced therefrom, the space between said collector (32, 33) and the central pipe (31) being in communication with the duct (40).

5. Dust collecting suction system according to claim 4 wherein the coarse dust separator (13) further comprises means (35, 36) for adjusting the relative axial spacing between the central pipe (31) and the collector (32, 33).

6. Dust collecting suction system according to claim 4 wherein said central pipe (31) of the coarse dust separator (13) is substantially vertically arranged and has at least two inlets (22, 23) for dust-loaded air from the hood (11), the inlets being symmetrically arranged with reference to the central pipe and directed towards the axis of the central pipe so that the air currents from the inlets are diverted when colliding with one another.

7. Dust collecting suction system according to claim 5 wherein said central pipe (31) of the coarse dust separator (13) is substantially vertically arranged and has at least two inlets (22, 23) for dust-loaded air from the hood (11), the inlets being symmetrically arranged with reference to the central pipe and directed towards the axis of the central pipe so that the air currents from the inlets are diverted when colliding with one another.

8. Dust collecting suction system according to claim 7 wherein said central pipe (31) is generally T-shaped.

9. Method according to claim 1 comprising feeding the dust-loaded air into said central pipe (31) through at least two inlets (22, 23) which are symmetrically arranged with reference to the central pipe and directed towards the axis of the central pipe so that the air currents from the inlets are diverted when colliding with one another and then passing through the central pipe.

10. Method of collecting dust during rock drilling comprising:

collecting the dust-loaded air that flows out of the borehole, separating most of the dust as a coarse fraction by passing same through a passage having a sharp bend therein to divert air flowing therethrough, the coarse dust, because of its inertia, not being diverted through said sharp bend, filtering the dust loaded air from which the coarse fraction has been removed to collect the remaining fine dust, cleaning the separated coarse dust from remaining fine dust mixed therewith by a current of air that is then mixed with the air that is to be filtered in order to remove fine dust collected and carried by the current of air, the cleaning step comprising passing the separated coarse dust downwardly through a substantially vertical elongated tube which has a length of several times the diameter thereof, the separated coarse dust falling substantially freely in said tube, and producing a current of atmospheric air upwardly through the tube counter-current to the direction of fall of said separated coarse dust to clean the coarse dust falling through the tube, the upward current of air, which contains the remaining fine dust then being filtered to collect the remaining fine dust therefrom, and then dumping the separated cleaned coarse dust on the ground.

11. Method according to claim 10 wherein the separated cleaned coarse fraction of dust is collected in a closed container (26) before being dumped on the ground.

12. Method according to claim 10 wherein the step of separating the coarse fraction of the dust comprises coupling the dust-loaded air collected from the bore hole to a coarse dust separator having an inlet central pipe (31) and a duct (40) formed therearound, the duct being formed such that inlet air to the coarse dust separator is diverted 180° between the central pipe and the duct so that coarse dust is thereby separated from the diverted air.

* * * * *